July 25, 1933.  J. J. NOVAK  1,919,961
PROPELLER AND FLYWHEEL
Filed April 9, 1931  2 Sheets-Sheet 1
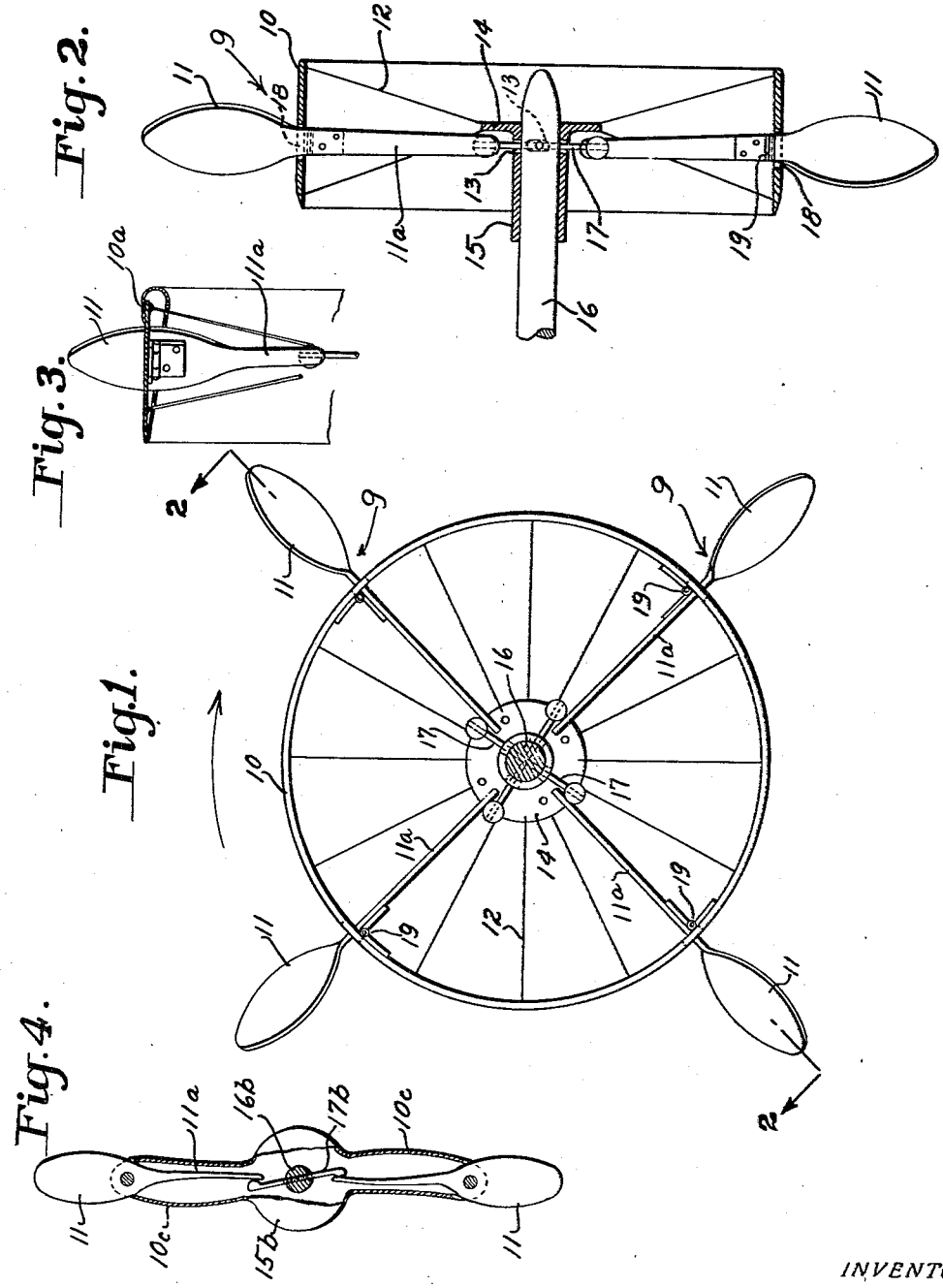
INVENTOR
Julius J. Novak.

July 25, 1933.  J. J. NOVAK  1,919,961
PROPELLER AND FLYWHEEL
Filed April 9, 1931  2 Sheets-Sheet 2
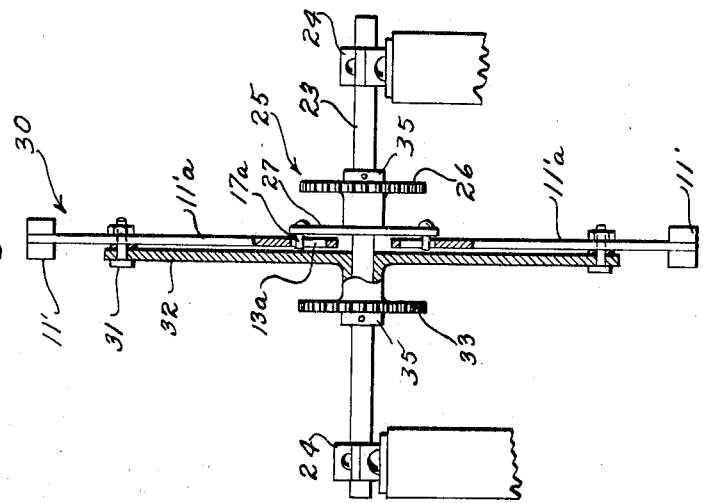
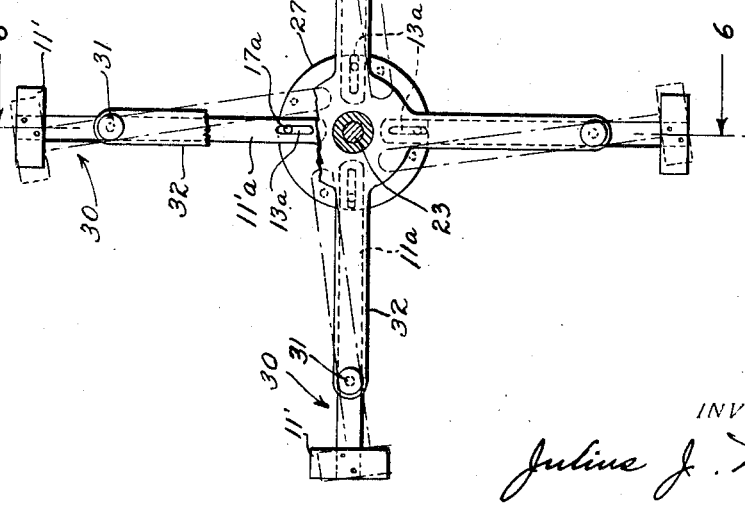
INVENTOR
Julius J. Novak.

Patented July 25, 1933

1,919,961

UNITED STATES PATENT OFFICE

JULIUS J. NOVAK, OF EAST ORANGE, NEW JERSEY, ASSIGNOR OF ONE-FOURTH TO LAURENCE A. STEINHARDT, OF NEW YORK, N. Y.

PROPELLER AND FLYWHEEL

Application filed April 9, 1931. Serial No. 528,770.

This invention relates to novel devices for transmitting energy, and is particularly adaptable for use in or with propellers, flywheels and the like to increase the efficiency of such mechanisms.

One of the objects of the invention is to utilize a transaxial energy to decrease the power necessary to drive a rotating member such as a propeller, flywheel, or the like.

Another object is to provide mechanism of the above-mentioned character in which the transaxial energy is generated and automatically transmitted by centrifugal force in the device.

Another object is to provide such a device in which the transaxial force is automatically transmitted to the cooperating component parts whenever resistance to motion increases.

Another object is to provide an energy storing member which yields an additional source of energy while in motion and under stress.

Another object is to make use of a novel principle of flexing a member in cooperation with a hollow or metal propeller.

Another object is to provide such devices having particular utility in automotive and aviation units of various kinds.

The foregoing and other objects, features and advantages of the invention will be readily understood from the following description in connection with the accompanying drawings, wherein several forms of the invention are shown and are not to be construed as a limitation of the invention:

Fig. 1 is an elevation of one form of the invention.

Fig. 2 is a transverse sectional view on the line 2—2 of Fig. 1.

Fig. 3 is a modification of the blade shown in Fig. 2.

Fig. 4 illustrates one method of applying the invention to a hollow or metal propeller.

Fig. 5 shows the invention embodied in a novel form of a flywheel.

Fig. 6 is a view taken on the line 6—6 of Fig. 5.

Referring particularly to the drawings, it will be seen in Fig. 1 that the first illustrated embodiment of the invention comprises a cylinder or annular member 10 and propeller blades or power means 11 which are radially spaced and pivotally mounted with reference to the member 10. Spokes 12 connect the annular member 10 to a flange 14 on the hub 15 which is mounted for limited rotation with reference to the drive shaft 16. In the hub 15 are apertures 13 through which project a plurality of radial contact rods 17, having their ends suitably secured to the shaft 16. The annular member 10 has openings 18 for accommodation of the blade extensions 11a. Pivot members 19 suitably hold blades 11 at their respective apertures 18 for functioning therethrough. Extensions 11a of blades 11 are long enough for driving contact with the rods 17 which are for fulcrum engagement with the blade extensions 11a during rotation of the parts.

Fig. 3 illustrates a modification of the blade 11 of Fig. 2, showing a portion of the thrust area of the blade 11 inside the annular member 10a which, in this form, is streamlined and adapted for use as a cowling of an engine or other power unit.

Fig. 4 illustrates the invention embodied in a hollow propeller, wherein the hollow blades 10c with their hub portion 15b are mounted for limited rotation on the shaft 16b. Flexible blades 11 are pivotally secured to the hollow blades 10, having their extensions 11a functioning internally. The internal surfaces of the blades 10c serve to limit the oscillation of the extensions 11a. In starting to operate, shaft 16b rotates contact rods 17b until the blade extensions 11a press against the inner surface of the hollow propeller blades, thereby causing the whole structure to revolve. When sufficient momentum is acquired, centrifugal force acts on the flexible blades 11 causing blades 10c to move forward with respect to the drive shaft 16b. Centrifugal force acting radially outward thereby centers the extensions in the hollow blades while the rods 17b maintain a fulcrum contact therewith, and drive the hollow blades via the extensions, the flexible blades and their pivot. Any flexing of the blades 11 results in a transaxial urge to the revolving structure. The illustrated embodiment shown is one preferred form. However, the flexible blades 11 and their extensions 11a can be made to function externally of a metal propeller.

In Fig. 5 the novel embodiment illustrates the principle of the invention adaptable to a flywheel. The corresponding parts have similar numerical indications of the forms shown in Fig. 1 and Fig. 4. The shaft 23 in Fig. 5 is mounted in pillow blocks 24. The driving means 25, slidable on shaft 23, comprises a gear 26, having an integral flange 27 from which pins 17a extend into slots 13a of the power units 30, said power unit including a weighted member 11' and extension 11'a. The power units 30 are pivoted by suitable means at 31 to arms or element 32, said element rotatable on the shaft 23 and having integral therewith a gear 33 for driving engagement with cooperative mechanisms not shown. Pins 17a function similar to rods 17 of Fig. 1, but in this form also serve to limit the oscillation of the extensions 11'a at the starting operation. The stop collars 35 are provided on the shaft 23, as shown in Fig. 6, to serve as thrust bearings for the gear members 33 and 26. The stop collars also limit axial movements of the members 33 and 26 on the shaft 23.

The dotted position of the parts shown in Fig. 5 indicate the movement of the members when starting or during rotation. This position shows an overload condition when centrifugal force acts on the weight members or power units to affect a transaxial transmission of the energy stored in the weight or power units to the arms or element 32.

It is to be understood that an automatic adjustment of the pivot and blades may be adopted. However, the preferred form shown is for illustration and clarity only and as constructed in the experimental model.

The several members of the propeller function as follows with reference to Figs. 1 and 2:

The shaft 16 is rotated by any suitable power means not shown, causing contact rods 17 fixed thereto to engage the forward end of their respective slots 13. The hub 15 then starts to rotate causing the rim 10 and blades 11 to revolve. When the required speed is attained, centrifugal force is greatest on the blades 11, holding them regidly outward of the rim 10; the contact rods 17 then become positioned midway of their slots and engage the ends of the blade extensions. When centrifugal force is generated, the blades 11 assume substantial radial relationship to shaft 16, and thus urge the rim to move forward releasing the rods 17 from contact with the forward ends of their slots 13. The driving torque now, is through the shaft 16, the contact rods 17, extensions 11a and the rim 10. Driving via the hub is eliminated when speed is attained. Under load the weighted ends or propeller blades 11 slightly incline to the left. Centrifugal force acts immediately to correct, or acting outward automatically results in a transaxial urge to the rim through their pivots. The contact rods 17 at their points of engagement then become fulcrum means to the leverage of the extensions 11a and the blades 11.

The inertia members 11 and 11' of Figs. 2 and 6, with their lever beam extensions 11a and 11'a rock or oscillate on their pivotal connections to the members 32 and 10 respectively, and are here designated power units 9 and 30 in Figs. 2 and 6.

While the invention has been illustrated separately as applied to a flywheel and propeller, it will be understood that it may equally well be employed in a combination of both forms or in the combination of independent blades of various designs with a flexing blade or weight member. Also, its use is advantageous in pumps, super-chargers and the like.

While there have been disclosed in this specification several forms in which the invention may be embodied, it is to be understood that these forms are shown for the purpose of illustration only, and that the invention is not to be limited to the specific disclosures but may be modified and embodied in various other forms without departing from its spirit. In short, the invention includes all the modifications and embodiments coming within the scope of the following claims.

Having thus described my invention, what I claim is:

1. An apparatus of the class described comprising a driving member, a relatively oscillatable driven member rotatable therewith, a shaft for supporting said members, power units supported by said driven member having driving contact with said driving member, and said driven member oscillatable on said shaft.

2. An apparatus of the class described comprising a driving member, an oscillatable driven member rotatable therewith, a shaft for supporting members, power units functioning on said driven member and having driving contact with said driving member, and said driven member oscillatable on said shaft.

3. An apparatus of the class described, comprising a driving member, an oscillatable element rotatable therewith and supported thereon, power units attached to said rotating element and adapted to maintain fulcrumed contact with said driving member, and said element oscillatable on said driving member.

4. An apparatus of the class described, comprising rotating elements including a driving member, an oscillatable driven member, power units mounted on said driven member and adapted to transmit a transaxial urge, and said driven member oscillatable on said driving member.

5. An apparatus of the class described, comprising rotating elements including a driving member, an oscillatable driven member slidable on said driving member, oscillatory power units mounted on said driven member and adapted to transmit a transaxial urge during rotation, and means to limit the extent of oscillations of said driven member.

6. An apparatus of the class described comprising a driving member, oscillatory elements thereon, flexible units secured to said elements and adapted to maintain an oscillatory contact with said driving member for rotation therewith.

7. An apparatus of the class described, comprising a driving member and a slidable hub element thereon including pivotal power means secured thereto, having fulcrum engagement with the driving member during rotation.

8. In a mechanism a driving member, a driven member supported thereon and adapted to rock during rotation, and centrifugal power means secured to said driven member having engagement with said driving member to affect rotation of said driven member.

9. An apparatus of the class described, comprising a driving member, an oscillatable driven member, and centrifugal effective means secured to said driven member, said centrifugal means effective only during rotation, and said driven member slidably mounted on said driving member for rotation therewith.

10. An apparatus of the class described, comprising a driving member, an oscillatable element supported by said member, means supported by said element having yieldable driving relation with the driving member, and said element rotatable with driven member during oscillations thereon.

11. An apparatus of the class described, comprising a driving member, an oscillatable driven member mounted thereon for rotation therewith, and centrifugal effective means secured to said driven member, said centrifugal means being adapted to rock during rotation, and said driven member oscillatable on said driving member.

12. An apparatus of the class described, comprising a driving member, an oscillatable driven member, and power multiplying means functioning with said driven member, said multiplying means being adapted to rock during rotation, and said driven member adapted to rock in proportion to the rocking motion of said means.

13. In combination with a propeller, oscillatable and pivotal means of the class described attached thereto and rotating therewith, and adapted to transmit a transaxial urge during rotation.

14. In combination with propelling means, oscillatable and pivotal means of the class described functioning cooperatively therewith, and means to cause said pivotal means to incline during revolutions of said propeller.

15. The combination of propelling means and an oscillatory cowling functioning cooperatively therewith, and means to control the extent of oscillation of said cowling.

16. The combination of propeller means and an oscillatable and rotatable cowling, means on said cowling to transmit a transaxial urge, and means to control the extent of oscillation of said cowling.

17. A mechanism comprising a driving member and an oscillatable driven member adapted to rock on said driving member during rotation therewith, centrifugal means functioning transaxially on said driven member and having lever engagement with the driving member to affect rotation of said mechanism.

18. A propeller mechanism, comprising a drive shaft having radial arms, a movable and oscillatable hub journaled to the drive shaft, members joining said hub with a rim, propeller blades of air-foil cross-section rockable on said rim and spaced thereon, extensions of said blades converging centrally of said rim for contact with said radial arms to affect rotation of said mechanism.

19. A flywheel mechanism, comprising a drive shaft having radial arms, a movable and oscillatable hub journaled to the shaft and means joining said hub with a rim, weighted members rockable on said rim and spaced thereon, extensions of said members converging centrally of said rim for contact with said arms to affect rotation of said mechanism.

20. In a flywheel mechanism, an oscillatable shaft having a driving member and a driven member thereon, inertia members supported by said driven member, lever extensions of said inertia members converging centrally to the shaft and engaging said driving member.

JULIUS J. NOVAK.